US012387368B2

(12) United States Patent
Kim et al.

(10) Patent No.: US 12,387,368 B2
(45) Date of Patent: Aug. 12, 2025

(54) ELECTRONIC DEVICE FOR CONTROLLING EXTERNAL ELECTRONIC DEVICE AND METHOD OF CONTROLLING THE SAME

(71) Applicant: Samsung Electronics Co., Ltd., Gyeonggi-do (KR)

(72) Inventors: Seokhyun Kim, Gyeonggi-do (KR); Chaigil Lim, Gyeonggi-do (KR); Gajin Song, Gyeonggi-do (KR); Sunkey Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 17/895,363

(22) Filed: Aug. 25, 2022

(65) Prior Publication Data
US 2023/0130891 A1    Apr. 27, 2023

Related U.S. Application Data

(63) Continuation of application No. PCT/KR2022/012018, filed on Aug. 11, 2022.

(30) Foreign Application Priority Data

Oct. 27, 2021  (KR) .................. 10-2221-0144502
Jan. 25, 2022  (KR) .................. 10-2022-0010512

(51) Int. Cl.
G06T 7/73       (2017.01)
G06T 7/80       (2017.01)
H04W 76/14     (2018.01)

(52) U.S. Cl.
CPC .............. *G06T 7/73* (2017.01); *G06T 7/80* (2017.01); *H04W 76/14* (2018.02); *G06T 2207/30244* (2013.01)

(58) Field of Classification Search
CPC ... G06T 7/73; G06T 7/80; G06T 2207/30244; G06T 7/70; H04W 76/14; H04W 84/18;
(Continued)

(56) References Cited

U.S. PATENT DOCUMENTS

2005/0041847 A1* 2/2005 Dorrance ........... G01B 11/2755
                                                     356/139.09
2008/0016451 A1* 1/2008 Funabashi ......... H04M 1/72427
                                                         715/757
(Continued)

FOREIGN PATENT DOCUMENTS

CN         106123895 A    11/2016
EP           2960622 A1   12/2015
(Continued)

OTHER PUBLICATIONS

International Search Report dated Nov. 22, 2022.
Extended European Search Report dated Sep. 24, 2024.

*Primary Examiner* — Nizar N Sivji
(74) *Attorney, Agent, or Firm* — Cha & Reiter, LLC.

(57) ABSTRACT

An electronic device and method are disclosed. The electronic device includes a communication module, a first camera disposed on a first surface of a housing, a second camera disposed on a second surface of the housing opposite to the first surface, and a processor. The processor implements the method, including: executing an application; establishing a communication connection with a second external electronic device; detecting at least one of an angle or a distance between the second external electronic device; visually detecting the at least one first external electronic device located in a field-of-view (FOV) of a first camera; detecting a distance between the electronic device and the at least one first external electronic device, based on the at least (Continued)

one of the angle or the distance; and detecting a position of the at least one first external electronic device.

20 Claims, 13 Drawing Sheets

(58) Field of Classification Search
CPC . G01S 5/02; G01S 11/02; G01S 13/02; G01S 13/76; G01S 13/86; G06F 1/16; G06F 3/0482; H04M 1/02; H04Q 9/00
See application file for complete search history.

(56) References Cited

U.S. PATENT DOCUMENTS

| | | | |
|---|---|---|---|
| 2008/0069449 A1 | 3/2008 | Cho et al. | |
| 2014/0152809 A1 | 6/2014 | Jarvis | |
| 2015/0326704 A1* | 11/2015 | Ko | H04M 1/72457 455/456.3 |
| 2016/0212587 A1 | 7/2016 | Cho et al. | |
| 2019/0242989 A1* | 8/2019 | Lee | G01S 5/0289 |
| 2020/0005145 A1 | 1/2020 | Kim et al. | |
| 2020/0359189 A1 | 11/2020 | Yoon et al. | |
| 2020/0412862 A1* | 12/2020 | Oh | H04W 76/14 |
| 2021/0006730 A1* | 1/2021 | Solomon | G06F 1/166 |
| 2021/0080961 A1* | 3/2021 | Shenai | B62D 7/144 |
| 2022/0355200 A1* | 11/2022 | Fukushige | A63F 13/44 |

FOREIGN PATENT DOCUMENTS

| | | |
|---|---|---|
| KR | 10-2008-0026003 A | 3/2008 |
| KR | 10-2008-0044654 A | 5/2008 |
| KR | 10-2011-0016167 A | 2/2011 |
| KR | 10-2016-0090231 A | 7/2016 |
| KR | 10-2016-0094197 A | 8/2016 |
| KR | 10-2019-0098102 A | 8/2019 |
| KR | 10-2020-0129320 A | 11/2020 |
| WO | 2016/192916 A1 | 12/2016 |

* cited by examiner

ELECTRONIC DEVICE FOR CONTROLLING EXTERNAL ELECTRONIC DEVICE AND METHOD OF CONTROLLING THE SAME

CROSS-REFERENCE TO RELATED APPLICATION(S)

This application is a continuation of International Application No. PCT/KR2022/012018 designating the United States, filed on Aug. 11, 2022, in the Korean Intellectual Property Receiving Office and claiming priorities to Korean Patent Application No. 10-2021-0144502, filed on Oct. 27, 2021, in the Korean Intellectual Property Office, and Korean Patent Application No. 10-2022-0010512, filed on Jan. 25, 2022, in the Korean Intellectual Property Office, the disclosures of which are incorporated by reference herein in their entireties.

BACKGROUND

Technical Field

Certain embodiments of the disclosure relate to remote control of electronic devices, and more particular, to registration and control of external devices using camera capture and network communication.

Description of Related Art

An electronic device may refer to a device that executes a one or more functions according to programs and applications loaded thereon. The electronic device may include smart home appliances, electronic notebooks, portable multimedia players, mobile communication terminals, tablet PCs, video/audio players, desktop/laptop computers, in-vehicle navigation systems, smart air conditioners, smart home fans, smart home lighting, and so on. The electronic device may be operated using a remote control. For example, a TV may be operated by a TV remote control, and an air conditioner may be operated by an air conditioner remote control.

Recent times have seen introduction of multi-device remote control functionality which implements different types of remote control functions in a single mobile device. According to a general point-to-control method, when a mobile device that supports an ultra-wideband (UWB) communication function is directed toward another UWB communication-enabled device, the mobile device may identify information of the device and display a control screen by which a user may interact with to control the device. With the use of the UWB communication, the mobile device may be used to control a variety of devices disposed around itself. The mobile device may implement this control function even within indoor areas with global positioning system (GPS) information is not readily available.

SUMMARY

To enable an electronic device to locate and control an external device using ultra-wideband (UWB) communication function, the external device should be equipped with a UWB antenna, and a UWB communication-enabled device equipped with the coordinates of the external device should be disposed within a certain range to enable UWB communication with the external device. To this end, the electronic device may in some cases be oriented towards an external device lacking a UWB antenna, and instead identify the external device using a camera (hereinafter, referred to as a rear camera) disposed on the rear surface of the electronic device, while performing UWB communication with a UWB-enabled device that periodically broadcasts a UWB signal. According to an embodiment, the UWB device may be a movable electronic device equipped with a UWB antenna or a fixed UWB device, such as an anchor device. For example, when a user orients the rear camera of their device towards an external device to be controlled, during registration of the external device in a control application installed in the electronic device, the electronic device may calculate the distance and angle between the UWB device and the electronic device using UWB communication with the UWB device, and calculate a relative location of the external device (e.g., such as being located along a same line as a wall on which the UWB device is located) based on the calculated distance and angle. This method is applicable when the external device is captured within the field of view of the rear camera of the electronic device, but is not applicable when the object is located outside the rear camera's field of view, such as when it is disposed so as to be captured by a front camera instead.

An electronic device according to certain embodiments of the disclosure may provide a method of locating and controlling an object that is located within the field of view of a front camera of the electronic device, while incapable of UWB communication, using the front camera of the electronic device.

According to certain embodiments, an electronic device is disclosed, including: a communication module; a first camera disposed on a first surface of a housing; a second camera disposed on a second surface of the housing opposite to the first surface; and at least one processor electrically coupled to the communication module, the first camera, and the second camera, wherein the at least one processor is configured to: execute an application for registering and controlling at least one first external electronic device, based on a user input, establish a communication connection with a second external electronic device different from the first external electronic device, using the communication module, detect at least one of an angle or a distance between the second external electronic device and the electronic device, detect a distance between the electronic device and the at least one first external electronic device, based on the detected at least one of the angle or the distance between the second external electronic device and the electronic device, and detect a position of the at least one first external electronic device, based on the detected distance between the electronic device and the at least one first external electronic device.

According to certain embodiments, a method of operating an electronic device is disclosed: executing, via at least one processor, an application for registering and controlling at least one first external electronic device, based on a user input, establishing a communication connection with a second external electronic device different from the first external electronic device, via a communication module, detecting at least one of an angle or a distance between the second external electronic device and the electronic device, visually detecting the at least one first external electronic device located in a field-of-view (FOV) of a first camera disposed on a first surface of a housing of the electronic device, and detecting a distance between the electronic device and the at least one first external electronic device, based on the at least one of the angle or the distance between the second external electronic device and the electronic device, and detecting a position of the at least one first external electronic device, based on the detected distance between the electronic device and the at least one first external electronic device.

According to certain embodiments, a method of locating and controlling an external device is disclosed. The external device may be located in in a field of view of a front camera of the electronic device, and is not capable of UWB communication. Accordingly, by using the front camera of the electronic device, the external device for which UWB communication is impossible incapable may nevertheless be located and controlled using the electronic device, regardless of the position of the external device.

DETAILED DESCRIPTION

Figure 1:
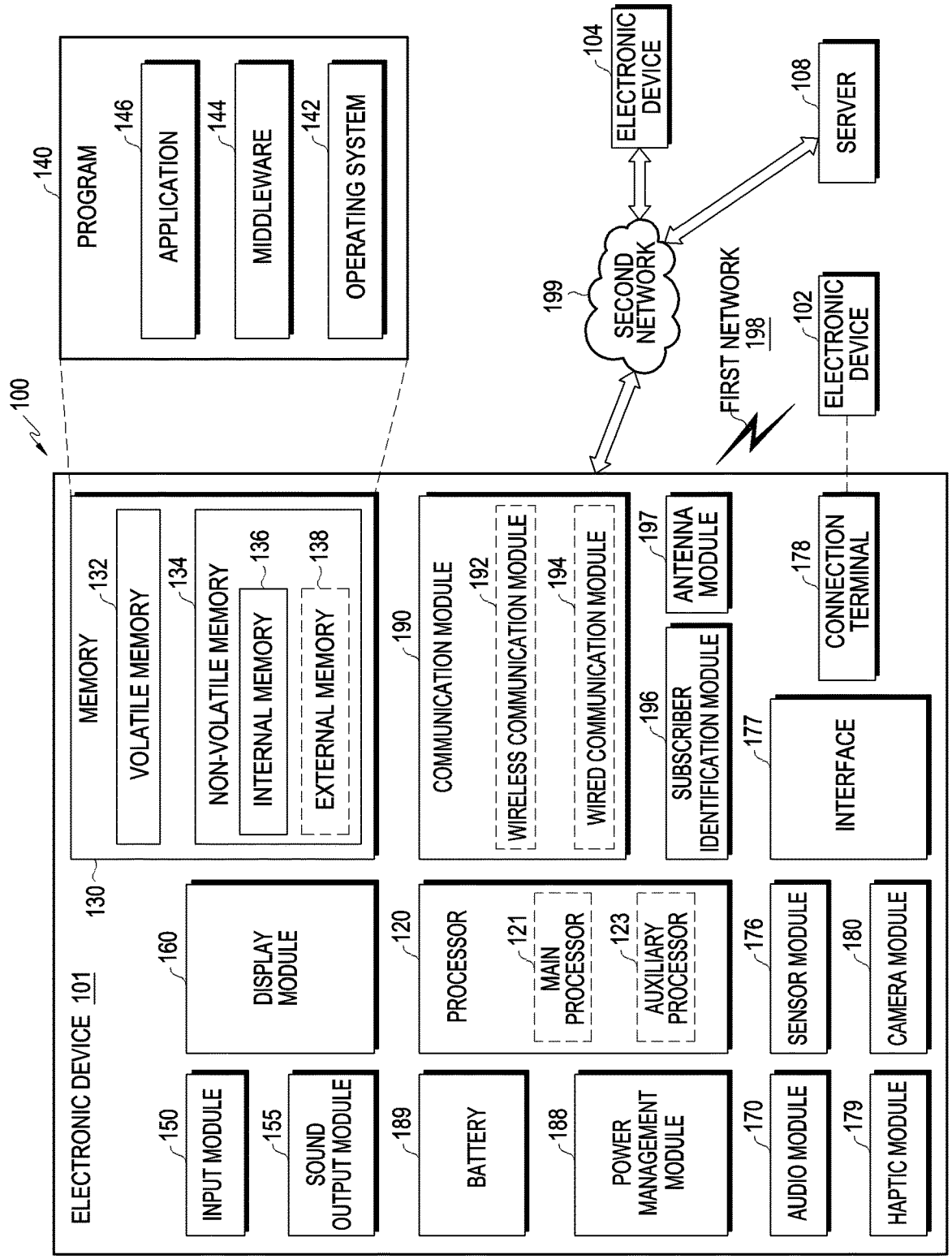
FIG. 1 is a block diagram illustrating an electronic device in a network environment according to certain embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
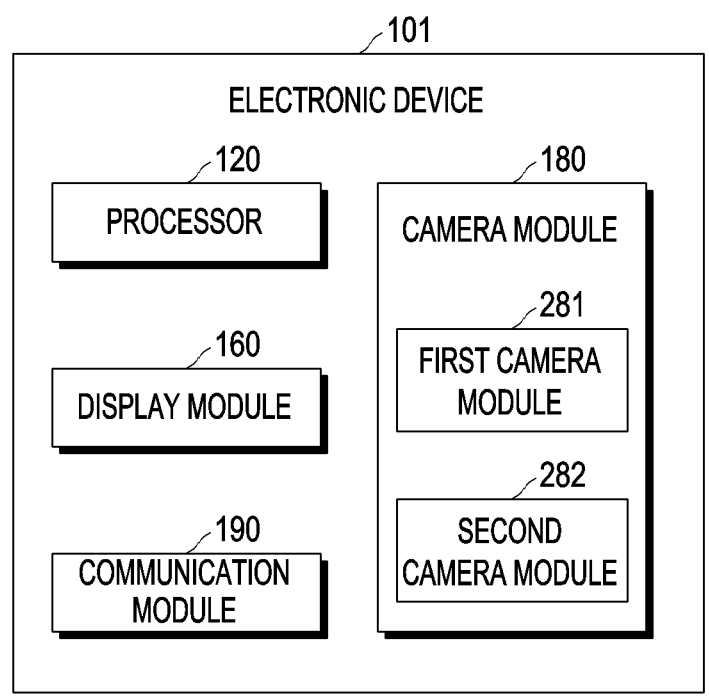
FIG. 2 is a block diagram illustrating an electronic device according to certain embodiments.

FIG. 2 is a block diagram illustrating the electronic device 101 according to certain embodiments.

Referring to FIG. 2, the electronic device 101 according to an embodiment may include the processor 120, the display module 160, the camera module 180, and the communication module 190.

According to an embodiment, the camera module 180 may be implemented with at least one camera module (e.g., a first camera module 281 and a second camera module 282). The first camera module 281 may include one or more lenses, image sensors, image signal processors, or flashes located on the rear surface of a case of the electronic device 101. Hereinafter, a rear camera is used in the same meaning as the first camera module 281. The second camera module 282 may include one or more lenses, image sensors, image signal processors, or flashes located on the front surface of the case of the electronic device 101. Hereinafter, a front camera is used in the same meaning as the second camera module 282.

According to an embodiment, a communication scheme supported by the communication module 190 of the electronic device 101 may include a communication scheme (e.g., a UWB communication scheme) which enables precise measurement of a direction and a distance.

For example, the electronic device 101 (e.g., the processor 120) may use the communication module 190 and/or the camera module 180 to identify the position of at least one external electronic device located in the vicinity of the electronic device 101. For example, the electronic device 101 may use the communication module 190 and/or the camera module 180 to identify the distance from the electronic device 101 to a first external electronic device and/or the direction of at least one second external electronic device with respect to the electronic device 101. The first external electronic device may be an electronic device having a communication function enabling measurement of a direction and a distance. The at least one second external electronic device may be an electronic device that does not have a communication function enabling measurement of a direction and a distance. The specific type of the communication scheme supported by the above-described communication module 190 is merely an example, and the supported communication scheme is not limited. The electronic device 101 may include a communication module not shown in FIG. 2, for which reference may be made to the description of FIG. 1.

According to an embodiment, the communication scheme supported by the communication module 190 of the electronic device 101 is a short-range wireless communication scheme that operates in the first network 198 (e.g., a short-range wireless communication network), inclusive of Bluetooth (or, Bluetooth low energy (BLE)), Zigbee, wireless fidelity (Wi-Fi), and/or near field communication (NFC). For example, the electronic device 101 (e.g., the processor 120) may perform short-range wireless communication with at least one external electronic device located in the vicinity of the electronic device 101 using the communication module 190.

According to an embodiment, the communication scheme supported by the communication module 190 of the electronic device 101 may include a communication scheme operating in the second network 199 (e.g., a long-range wireless communication network). For example, the electronic device 101 (e.g., the processor 120) may perform long-range wireless communication with at least one external electronic device, using the communication module 190.

According to an embodiment, the processor 120 of the electronic device 101 may execute a control application that controls an external electronic device, based on a user input, and display an execution screen of the control application on the display module 160 to register the external electronic device in the control application or control the external electronic device with the control application.

According to certain embodiments, upon selection of a device registration menu in the control application by a user input, the processor 120 of the electronic device 101 may drive the first camera module 281 to register an external electronic device, and accordingly, display a scene recognized through the rear camera of the electronic device 101 on the display module 160.

According to certain embodiments, the processor 120 of the electronic device 101 may establish a communication connection with another electronic device (e.g., a UWB communication-enabled UWB device) equipped with a communication function that enables measurement of a direction and a distance, using a communication module (e.g., the communication module 190 of FIG. 2), and measure the distance between the electronic device 101 and the other electronic device.

According to certain embodiments, the processor 120 of the electronic device 101 may drive the second camera module 282 to register an external electronic device 410 located behind the user in the control application, and accordingly, display a scene including the external electronic device 410 recognized through the front camera of the electronic device 101 on the display module 160.

According to certain embodiments, the processor 120 of the electronic device 101 may measure the distance between the electronic device 101 and the external electronic device based on the distance between the electronic device 101 and the other electronic device equipped with the communication function that enables measurement of a direction and a distance, and the distance between the other electronic device and a rear wall on which the external electronic device is located and located in a direction in which the first camera faces, and calculate the position of the external electronic device based on the measured distance.

According to certain embodiments, the processor 120 of the electronic device 101 may store the position of the external electronic device in a server (e.g., the server 108 of FIG. 1) or memory (e.g., the memory 130 of FIG. 1) of the electronic device 101 to register the external electronic device in the control application.

According to certain embodiments, upon selection of a device control menu in the control application by a user input, the processor 120 of the electronic device 101 may drive the first camera module 281 to control the external electronic device, and accordingly, display a scene recognized through the rear camera of the electronic device 101 on the display module 160.

According to certain embodiments, the processor 120 of the electronic device 101 may establish a communication connection with the other electronic device, using the communication module (e.g., the communication module 190 of FIG. 2), and measure the distance between the other electronic device and the electronic devices 101.

According to certain embodiments, the processor 120 of the electronic device 101 may drive the second camera module 282 to control the external electronic device located behind the user, and thus display a scene including the external electronic device recognized through the front camera of the electronic device 101 on the display module 160.

According to certain embodiments, the processor 120 of the electronic device 101 may measure the distance between the electronic device 101 and the external electronic device and calculate the position of the external electronic device, based on the distance between the electronic device 101 and the other electronic device and the previously stored distance between the other electronic device and the rear wall.

According to certain embodiments, the processor 120 of the electronic device 101 may identify that the external electronic device is a pre-registered device based on the calculated position of the external electronic device, and display a user interface (UI) for controlling the external electronic device on the display module 160.

Various methods using a short-range wireless communication scheme such as Bluetooth, Zigbee, Wi-Fi, and/or NFC may be applied to subsequent specific operations in which the electronic device 101 controls the external electronic device 410, and a description of the schemes is avoided herein.

Figure 3A:
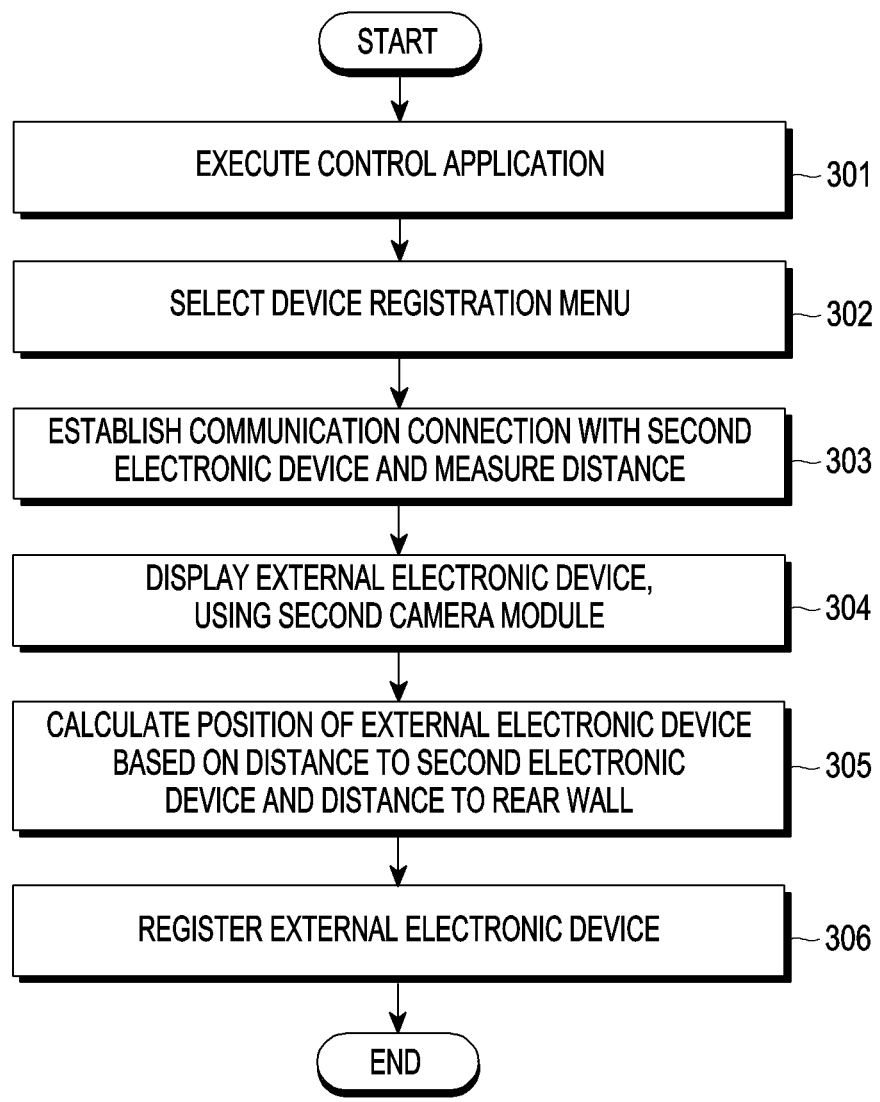
FIGS. 3A and 3B are flowcharts illustrating operations of an electronic device according to certain embodiments.
Figure 3B:
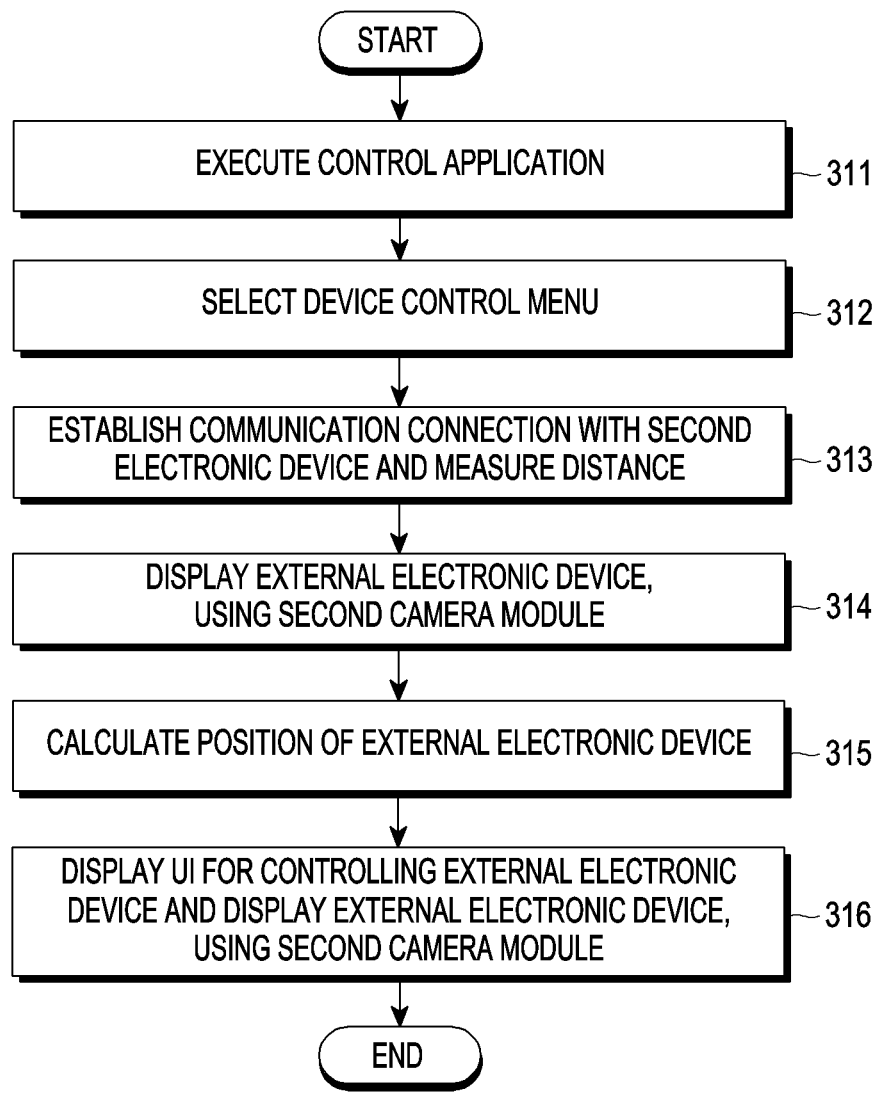

FIGS. 3A and 3B are flowcharts illustrating operations of an electronic device according to certain embodiments. FIGS. 3A and 3B will be described with reference to FIG. 4.

Figure 4:
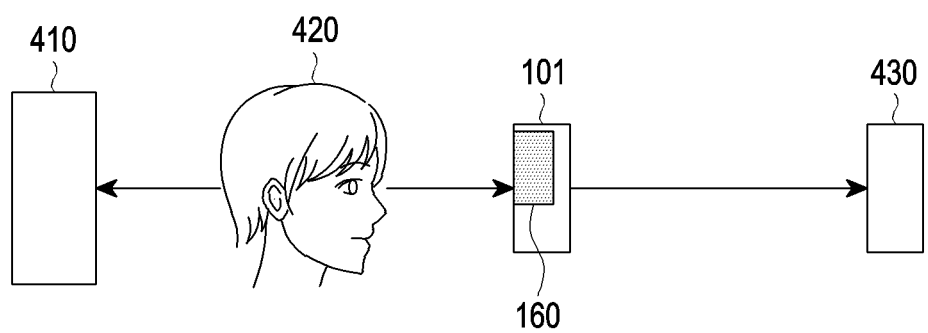
FIG. 4 is a diagram illustrating an operation of an electronic device according to certain embodiments.

FIG. 4 is a diagram illustrating an operation of an electronic device according to certain embodiments.

Referring to FIG. 4, a first electronic device 101 (e.g., the electronic device 101 of FIG. 1 or the electronic device 101 of FIG. 2) may communicate with a second electronic device 430 (e.g., a UWB device) (e.g. by UWB communication). Facing the display module 160 located on the front surface of the first electronic device 101, a user 420 of the first electronic device 101 may want to control an external electronic device 410 located behind the user, using the first electronic device 101. According to an embodiment, the external electronic device 410, which is a device controllable through the first electronic device 101 by short-range wireless communication with the first electronic device 101, may be an electronic device which is not equipped with a communication function (e.g., a UWB communication function) enabling measurement of a direction and distance, and the type of the external electronic device 410 is not limited. According to an embodiment, the second electronic device 430 may be an electronic device that is capable of communicating with the first electronic device 101 and periodically broadcasts a signal for direction and distance measurement.

Referring to FIG. 3A, according to certain embodiments, the first electronic device 101 (e.g., the processor 120) may execute a control application for controlling the external electronic device 410 based on an input of the user 420 and display an execution screen of the control application on the display module 160, to register the external electronic device 410 in the control application in operation 301.

According to certain embodiments, the execution screen of the control application may display a menu selection screen for selecting one or more menu elements or objects. The menu selection screen may include at least one object corresponding to the at least one menu. It is understood that the types of objects included in the menu selection screen and the types of menus corresponding to the objects are not limited to the literal disclosures herein, and any suitable arrangements, objects, etc. may be utilized. At least one menu selectable through the menu selection screen may include a device registration option. Device registration may indicate registering a new external electronic device for remote control through the control application of the electronic device.

In operation 302, according to certain embodiments, upon detecting selection of a device registration menu displayed in the control application by an input of the user 420, the first electronic device 101 may drive (e.g., activate) the first camera module 281 for registration of the external electronic device 410, and accordingly, display a preview image captured through the rear camera of the electronic device 101 on the display module 160.

According to certain embodiments, the first electronic device 101 may recognize the second electronic device 430 as disposed within the vicinity of the first electronic device 101, using a communication module (e.g., the communication module 190 of FIG. 2), establish a communication connection with the second electronic device 430, and measure the position of the second electronic device 430 in operation 303. According to certain embodiments, the first electronic device 101 may recognize at least one external electronic device (e.g., the second electronic device 430 illustrated in FIG. 4) using the communication module 190, based on the relative positions of the first electronic device 101 and the at least one external device being within a range measurable using the communication module. According to an embodiment, the position of the second electronic device 430 may be determined based on a distance and/or an angle between the electronic device 101 and the second electronic device 430.

For example, FIG. 4 illustrates that the first electronic device 101 is oriented toward the second electronic device 430 between the second electronic device 430 and the external electronic device 410. Referring to FIG. 4, the first electronic device 101 may determine whether the position of the second electronic device 430 is included within a preset range. According to an embodiment, the first electronic device 101 may identify whether the distance between the first electronic device 101 and the second electronic device 430 is disposed within a preset range, using the communication module 190 supporting the UWB communication scheme. According to another embodiment, the first electronic device 101 may identify whether an angle between the first electronic device 101 and the second electronic device 430 is within a preset range. According to another embodiment, it may be identified whether the distance and angle between the first electronic device 101 and the second electronic device 430 are within a preset range.

For example, in FIG. 4, the first electronic device 101 may capture the second electronic device 430, without capturing the external electronic device 410, due to its present orientation toward the second electronic device 430. According to an embodiment, when the first electronic device 101 recognizes another electronic device (e.g., the second electronic device 430), this may indicate that the first electronic device 101 identifies that the distance between the first electronic device 101 and the other electronic device (e.g., the second electronic device 430) is within a preset range based on single-sided two-way ranging (SS-TWR) and/or double-sided two-way ranging (DS-TWR), by transmitting and receiving messages (e.g., a ranging poll message, a ranging response message, and/or a ranging final message in the case of UWB communication) between the first electronic device and the other electronic device (e.g., the second electronic device 430) in a communication scheme enabling measurement of a direction and a distance. According to another embodiment, when the first electronic device 101 recognizes another electronic device (e.g., the second electronic device 430), this may indicate that when the first electronic device and the other electronic device (e.g., the second electronic device 430) transmit and receive a message (e.g., a ranging poll message, a ranging response message, and/or a ranging final message in the case of UWB communication) to and from each other in a communication scheme enabling measurement of a direction and a distance, the first electronic device 101 may measure the angle with the second electronic device 430 based on an angle of arrival (AoA) when receiving the message through two or more antennas, or based on an angle of departure (AoD) when transmitting the message through two or more antennas, and identify that the angle between the first electronic device 101 and the other electronic device (e.g., the second electronic device 430) is within a preset range.

According to certain embodiments, in operation 304, the first electronic device 101 may activate the second camera module 282 and accordingly, display a preview including the external electronic device 410 as captured through the front camera of the first electronic device 101 on the display module 160, to register the external electronic device 410 that is disposed behind the user 420 in the control application.

In operation 305, according to certain embodiments, the first electronic device 101 may determine the distance between the first electronic device 101 and the external electronic device 410 based on the distance between the first electronic device 101 and the second electronic device 430 and the distance between the second electronic device 430 and the rear wall where the external electronic device 410 is located, and calculate the position of the external electronic device 410 based on the measured distance. The calculation of the distance between the second electronic device 430 and the rear wall where the external electronic device 410 is located will be described later with reference to FIGS. 5 and 6.

In operation 306, according to certain embodiments, the first electronic device 101 may store the position of the external electronic device 410 in the server (e.g., the server 108 of FIG. 1) or memory (e.g., the memory 130 of FIG. 1) of the first electronic device 101, thereby registering the external electronic device 410 in the control application.

Referring to FIG. 3B, according to certain embodiments, the first electronic device 101 (e.g., the processor 120) may execute the control application based on an input of the user 420 and display the execution screen of the control application on the display module 160, to control the external electronic device 410 with the control application in operation 311.

According to certain embodiments, the execution screen of the control application may display a menu selection screen for selecting at least one object or element from a menu. For example, the menu selection screen may include at least one object corresponding to the at least one menu, and the types of objects included in the menu selection screen and the types of menus corresponding to the objects are not limited. At least one menu selectable through the menu selection screen may include device control. Device control may mean controlling an external electronic device pre-registered in the control application of the electronic device, using the control application.

In operation 312, according to certain embodiments, upon selection of a device control menu in the control application by an input of the user 420, the first electronic device 101 may activate the first camera module 281 to facilitate control the external electronic device 410, and thus display a preview of a field of view captured through the rear camera of the first electronic device 101 on the display module 160.

In operation 313, according to certain embodiments, the first electronic device 101 may establish a communication connection with the second electronic device 430, using the communication module (e.g., the communication module 190 of FIG. 2), and measure the distance between the second electronic device 430 and the first electronic device 101.

In operation 314, according to certain embodiments, the first electronic device 101 may activate the second camera module 282 to control the external electronic device 410 disposed behind the user 420, and thus display a preview image of a field of view including the external electronic device 410 captured through the front camera of the first electronic device 101 on the display module 160.

In operation 315, according to certain embodiments, the first electronic device 101 may determine the distance between the first electronic device 101 and the external electronic device 410, and determine the position of the external electronic device 410, based on the distance between the first electronic device 101 and the second electronic device 430 and the pre-stored distance between the second electronic device 430 and the rear wall.

In operation 316, according to certain embodiments, the first electronic device 101 may identify that the external electronic device 410 is a pre-registered device, based on the calculated position of the external electronic device 410, and display a UI for controlling the external electronic device 410 on the display module 160.

Various methods using a short-range wireless communication scheme such as Bluetooth, Zigbee, Wi-Fi, and/or NFC may be applied to specific operations of controlling the external electronic device 410 by the first electronic device 101, and their description will be avoided herein.

Figure 5A:
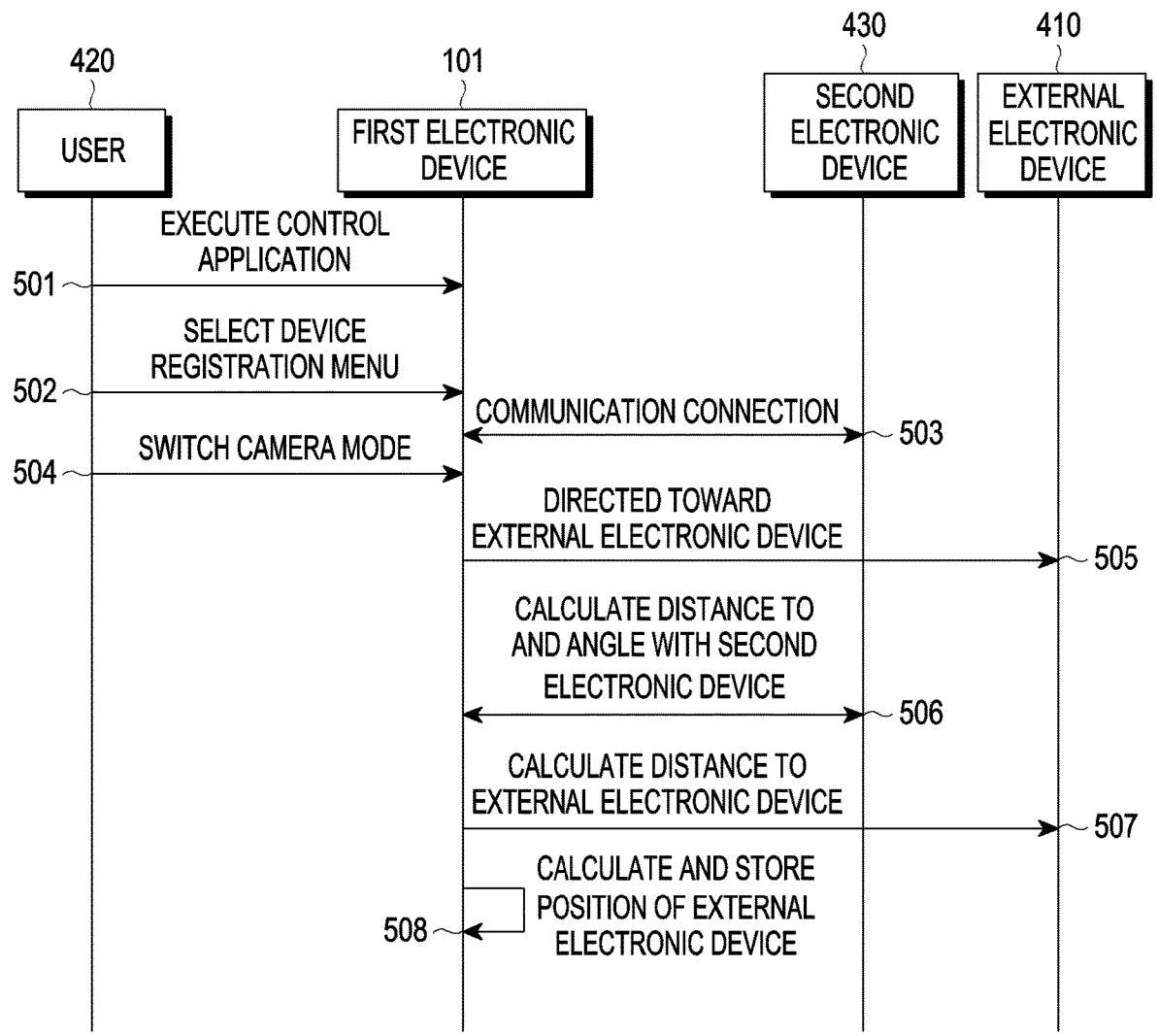
FIGS. 5A and 5B are flowcharts illustrating operations of registering an external electronic device in a control application by an electronic device according to certain embodiments.
Figure 5B:
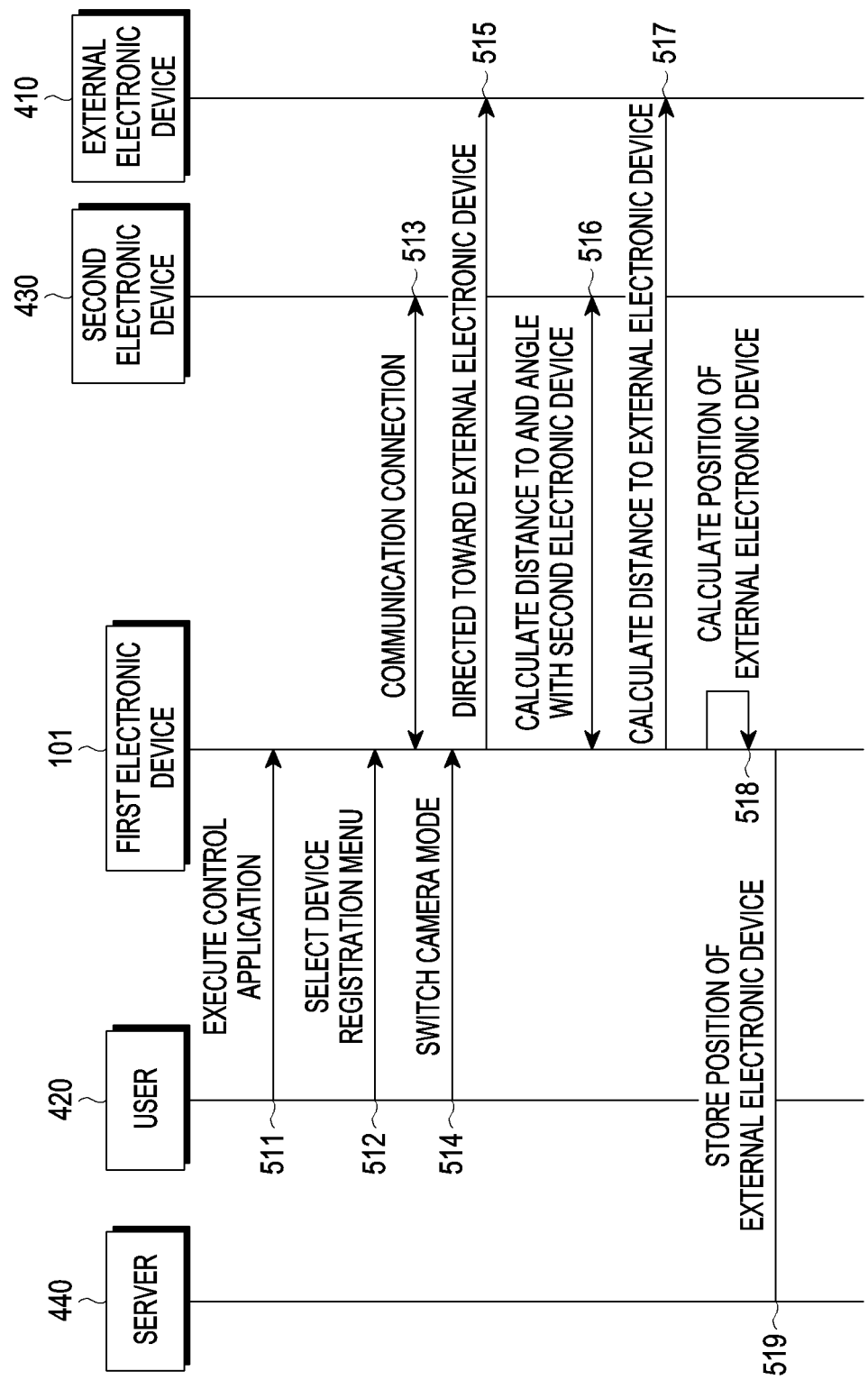

FIGS. 5A and 5B are flowcharts illustrating operations of registering an external electronic device in a control application by an electronic device according to certain embodiments. FIG. 5A illustrates a case in which a server is not included, and FIG. 5B illustrates a case in which a server 440 is included.

Referring to FIG. 5A, in operation 501, according to certain embodiments, the first electronic device 101 (e.g., the processor 120) may execute a control application based on an input of the user 420, and display an execution screen of the control application on the display module 160.

Upon selection of a device registration menu in the control application by a user input in operation 502, the first electronic device 101 may establish a communication connection (e.g., a UWB communication connection) with the second electronic device 430 (e.g., the UWB device) and measure the distance between the second electronic device 430 and the first electronic device 101, using a communication module (e.g., the communication module 190 of FIG. 2) in operation 503.

According to certain embodiments, the first electronic device 101 may transmit a broadcast signal and receive a response signal to the broadcast signal from the second electronic device 430.

Transmission of a broadcast signal by the first electronic device 101 may be understood as performing a scan operation by the first electronic device 101. Alternatively, when the first electronic device 101 transmits a broadcast signal and receives a response signal to the broadcast signal, it may be understood that the first electronic device 101 performs a scan operation.

When at least one external device (e.g., the second electronic device 430) is scanned through the scan operation of the first electronic device 101, the first electronic device 101 may identify that the second electronic device 430 is located in the vicinity of the first electronic device 101. In an embodiment, the operation of scanning at least one external device by the first electronic device 101 may be distinguished from an operation of recognizing one external device by the first electronic device 101. For example, when the first electronic device 101 identifies the second electronic device 430 through the scan operation, this may indicate that the first electronic device 101 determines that the second electronic device 430 is located in the vicinity of the first electronic device 101. When the first electronic device 101 recognizes the second electronic device 430 through communication, this may indicate that as the first electronic device 101 is oriented toward the second electronic device 430, the first electronic device 101 may identify relative positions of the first electronic device 101 and the second electronic device 430 to be within a preset range. While the operation of scanning an external device and the operation of recognizing an external device have been described separately in the disclosure, it should be understood this is merely for convenience of description, and the operation of scanning an external device may also be understood as included in the operation of recognizing an external device. For example, when it is said that the first electronic device 101 performs a recognition operation on at least one external device (e.g., the second electronic device 430) through communication, this may be understood that the first electronic device 101 performs the scan operation and performs the operation of recognizing at least one external device (e.g., the second electronic device 430) located in the vicinity through communication. For example, upon selection of the device registration menu in the control application, the first electronic device 101 may recognize the communication module 190 located in the vicinity, using the communication module 190. Alternatively, according to an embodiment, the first electron device 101 may identify at least one external device (e.g., the second electronic device 430) located in the vicinity by performing the scan operation, identify selection of the device registration menu, and then perform the recognition operation.

According to certain embodiments, the first electronic device 101 may recognize the second electronic device 430, using the communication module 190. For example, the first electronic device 101 may recognize the second electronic device 430, using the communication module 190, based on the relative positions of the first electronic device 101 and the second electronic device 430 corresponding to a set range. For example, referring to FIG. 4, as the first electronic device 101 is oriented toward the second electronic device 430, the first electronic device 101 may recognize the second electronic device 430, using the communication module 190.

According to certain embodiments, upon selection of the device registration menu in the control application by a user input, the first electronic device 101 may drive the first camera module 281 and accordingly, display a scene recognized through the rear camera of the first electronic device 101 on the display module 160.

In operation 504, according to certain embodiments, the first electronic device 101 may switch a camera mode to a selfie-mode, drive the second camera module 282, and thus display a scene including the external electronic device 410, recognized through the front camera of the external electronic device 410, on the display module 160, to register the external electronic device 410 located behind the user 420 in the control application.

According to certain embodiments, the camera mode may be switched to use the second camera module 282 by an input of the user 420. According to certain embodiments, the camera mode may be switched to use the second camera module 282 by swiping a display screen of the first electronic device or touching a separate camera mode switch icon by the user 420. According to certain embodiments, the first electronic device 101 may perform mode switching to switch to the second camera module 282 by detecting a voice or gaze movement of the user 420, using a sensor module (e.g., the sensor module 176) of the first electronic device 101. According to certain embodiments, the first electronic device 101 may simultaneously drive the first camera module 281 and the second camera module 282, and accordingly, display a scene recognized through the rear camera and a scene recognized through the front camera of the electronic device 101 on the display module 160.

In operation 505, according to certain embodiments, the first electronic device 101 may be oriented toward the external electronic device 410 to be registered by using the second camera module 282.

In operation 506, according to certain embodiments, the first electronic device 101 may calculate the distance and angle between the electronic device 101 and the second electronic device 430, through communication with the second electronic device 430.

In operation 507, according to certain embodiments, the first electronic device 101 may calculate the distance between the first electronic device 101 and the external electronic device 410 based on the distance and angle between the first electronic device 101 and the second electronic device 430. According to certain embodiments of the disclosure, the first electronic device 101 may calculate the distance between the first electronic device 101 and the external electronic device 410 based on the distance and angle between the first electronic device 101 and the second electronic device 430 and the distance between the rear wall where the external electronic device 410 is located and the second electronic device 430.

According to certain embodiments, the distance from the rear wall where the external electronic device 410 is located to the second electronic device 430 may be determined by placing the first electronic device 101 on the rear wall and then measuring the distance between the first electronic device 101 and the second electronic device 430.

According to certain embodiments, the distance from the rear wall where the external electronic device 410 is located to the second electronic device 430 may be obtained using a focal length or a depth sensor of the second camera module 282.

According to certain embodiments, the distance from the rear wall where the external electronic device 410 is located to the second electronic device 430 may be obtained through a user input.

According to certain embodiments, the first electronic device 101 may measure the distance between the rear wall and the first electronic device 101 through a communication connection with another external electronic device which is located on the rear wall and equipped with a communication function enabling measurement of a direction and a distance, and obtain the distance between the rear wall and the second electronic device 430 based on the measured distance.

In operation 508, according to certain embodiments, the first electronic device 101 may calculate the position of the external electronic device 410 based on the distance between the first electronic device 101 and the external electronic device 410. According to certain embodiments, the first electronic device 101 may register the external electronic device 410 in the control application by storing the calculated position of the external electronic device 410 in the memory (e.g., the memory 130 of FIG. 1) of the first electronic device 101. According to certain embodiments, the first electronic device 101 may store a picture of the external electronic device 410 together with the position of the external electronic device 410, so that when controlling the external electronic device 410 through the control application after the registration, a guideline may be provided on a display screen to increase the recognition rate of the external electronic device 410 and allow the user to accurately direct the first electronic device 101 toward the external electronic device 410. According to an embodiment, the stored position of the external electronic device 410 may be used for the first electronic device 101 to set a recognition range for the external electronic device 410 or to specify the external electronic device 410 based on the stored position, when the first electronic device 101 controls the external electronic device 410 through the control application after the registration.

Referring to FIG. 5B, operations 511 to 517 are identical to operations 501 to 507 of FIG. 5A, and thus their redundant description will be avoided.

In operation 518, according to certain embodiments, the first electronic device 101 may calculate the position of the external electronic device 410 based on the distance between the first electronic device 101 and the external electronic device 410.

In operation 519, according to certain embodiments, the first electronic device 101 may register the external electronic device 410 in the control application by storing the calculated position of the external electronic device 410 in the external server 440 (e.g., the server 108 of FIG. 1). According to certain embodiments, the first electronic device 101 may store a captured picture of the external electronic device 410 together with the position of the external electronic device 410, so that when controlling the external electronic device 410 through the control application after the registration, a guide may be displayed on a display screen to increase the ease of recognition of the external electronic device 410, and allow the user to accurately direct the first electronic device 101 toward the external electronic device 410. According to an embodiment, the stored position of the external electronic device 410 may be used for the first electronic device 101 to set a recognition range for the external electronic device 410 or to specify the external electronic device 410 based on the stored position, when the first electronic device 101 controls the external electronic device 410 through the control application after the registration.

Figure 6:
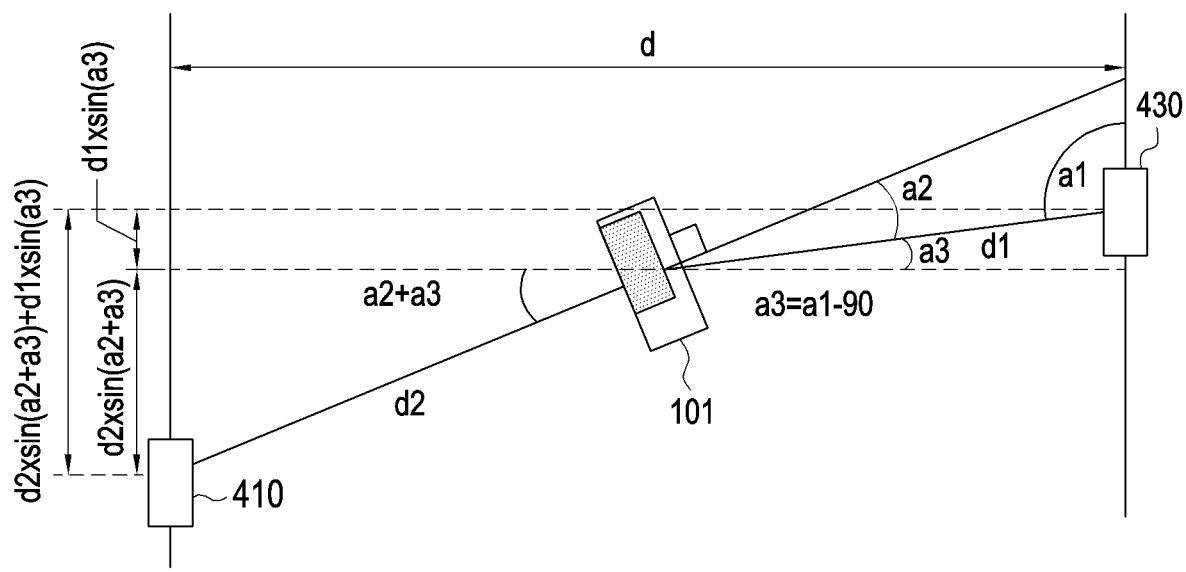
FIG. 6 is a diagram illustrating a method of calculating the position of an external electronic device by an electronic device according to certain embodiments.

FIG. 6 is a diagram illustrating a method of calculating the position of an external electronic device by an electronic device according to certain embodiments.

Referring to FIG. 6, according to certain embodiments, the first electronic device 101 and the second electronic device 430 (e.g., UWB device) may calculate a distance d1 between the first electronic device 101 and the second electronic device 430 and an angle (a2+a3) between the first electronic device 101 and the second electronic device 430 through a communication scheme (e.g., a UWB communication scheme) enabling measurement of a direction and a distance with the second electronic device 430.

According to certain embodiments, the first electronic device 101 may obtain a distance d from the second electronic device 430 to the rear wall, and obtain a distance d2 and an angle (a2+a3) between the first electronic device 101 and the external electronic device 410 based on the angles a2 and a3.

According to certain embodiments of the disclosure, the distance d from the rear wall where the external electronic device 410 is located to the second electronic device 430 may be determined by placing the first electronic device 101 on the rear wall and calculating the distance between the second electronic device 430 and the first electronic device 101.

According to certain embodiments, the distance d from the rear wall where the external electronic device 410 is located to the second electronic device 430 may be obtained using a focal length or a depth sensor of the second camera module 282.

According to certain embodiments, the distance d from the rear wall where the external electronic device 410 is located to the second electronic device 430 may be obtained through a user input.

According to certain embodiments, the first electronic device 101 may measure the distance from the rear wall to the first electronic device 101 through a communication connection with another external electronic device which is located on the rear wall and having a communication function enabling measurement of a direction and a distance, and obtain the distance d from the rear wall to the second electronic device 430 based on the measured distance.

According to certain embodiments, the first electronic device 101 may calculate the position of the external electronic device 410, using the values d1, d2, a2, and a3.

Figure 7A:
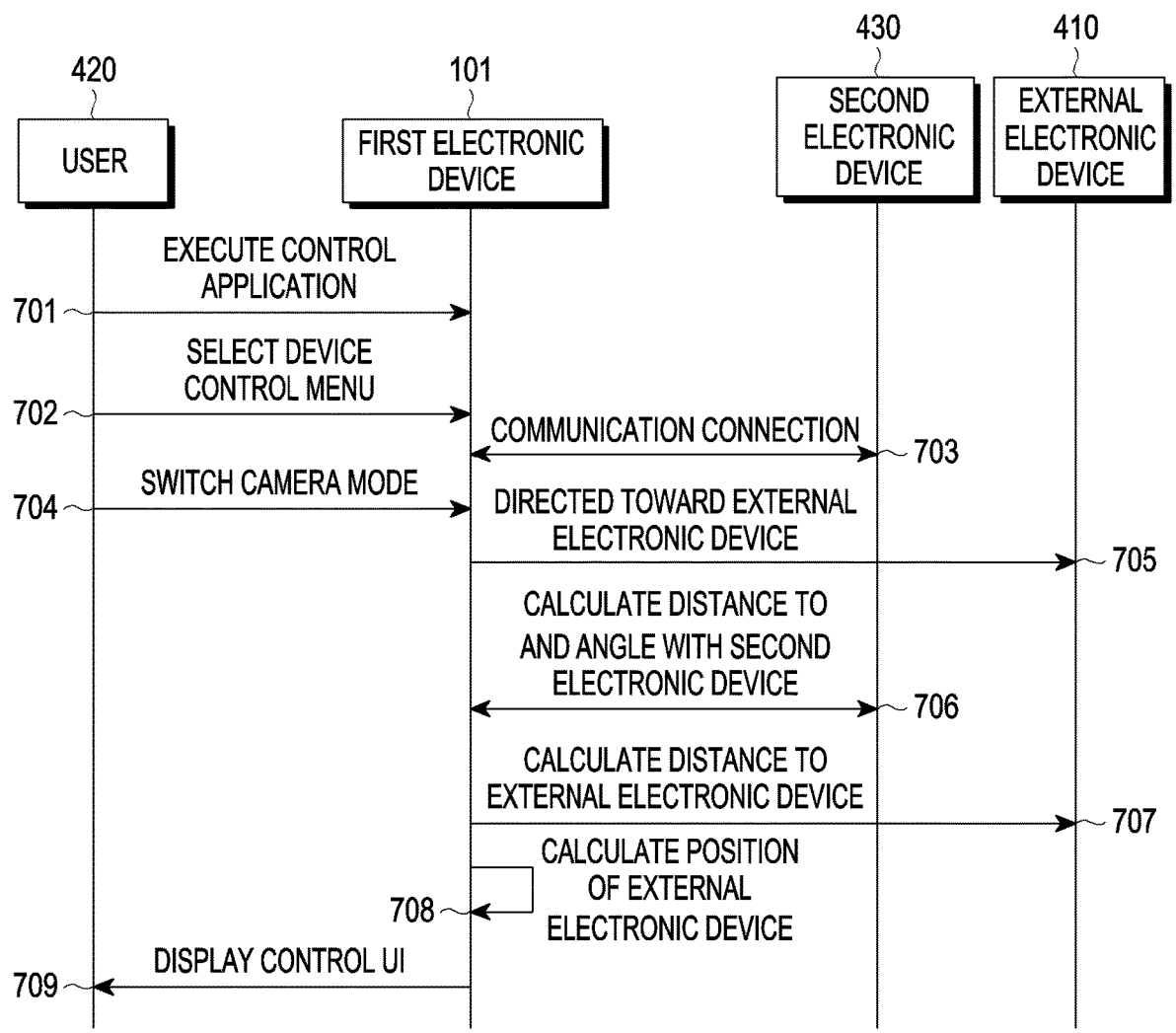
FIGS. 7A and 7B are flowcharts illustrating an operation of recognizing and positioning an external electronic device to control the external electronic device by an electronic device according to certain embodiments.
Figure 7B:
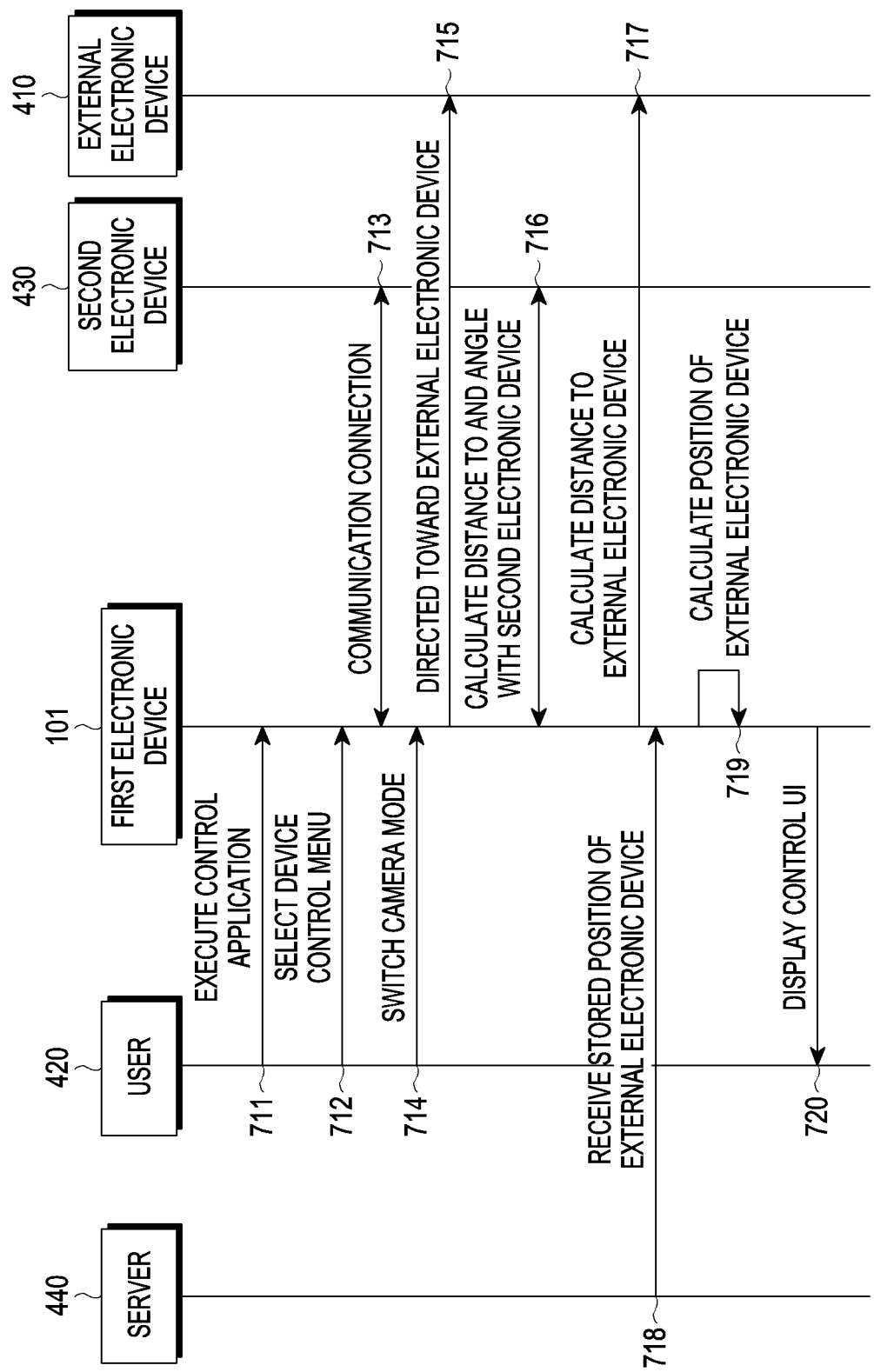

FIGS. 7A and 7B are flowcharts illustrating an operation of recognizing and positioning an external electronic device to control the external electronic device by an electronic device according to certain embodiments. FIG. 7A illustrates a case in which a server is not included, and FIG. 7B illustrates a case in which the server 440 is included.

Referring to FIG. 7A, in operation 701, according to certain embodiments, the first electronic device 101 (e.g., the processor 120) may execute a control application based on (e.g., responsive to) an input of the user 420, and display an execution screen of the control application execution screen on the display module 160.

Upon selection of a device registration menu in the control application by a user input in operation 702, the first electronic device 101 may establish a communication connection (e.g., UWB communication connection) with the second electronic device 430 (e.g., UWB device) and measure the distance between the second electronic device 430 and the electronic device 101, using the communication module (e.g., the communication module 190 of FIG. 2) in operation 703. According to certain embodiments, upon selection of a device control menu in the control application by an input of the user 420, the first electronic device 101 may drive the first camera module 281, and thus display a scene recognized through the rear camera of the first electronic device 101 on the display module 160.

In operation 704, according to certain embodiments, the first electronic device 101 may switch a camera mode to a selfie-mode, drive the second camera module 282, and thus display a scene including the external electronic device 410, as captured through the front camera of the external electronic device 410, on the display module 160, to control the external electronic device 410 located behind the user 420.

According to certain embodiments, the camera mode may be switched to operation of the second camera module via an input of the user 420. According to certain embodiments, as the user 420 swipes a display screen of the electronic device 101 or touches a separate camera mode switch icon, operation may switch from the first camera module 281 to the second camera module 282. According to certain embodiments, the first electronic device 101 may execute mode switch to use the second camera module 282 by detecting a voice or a gaze movement of the user 420 using the sensor module (e.g., the sensor module 176 of FIG. 1) of the first electronic device 101. According to certain embodiments, the first electronic device 101 may simultaneously drive the first camera module 281 and the second camera module 282, and accordingly, display a scene recognized through the rear camera and a scene recognized through the front camera of the first electronic device 101 on the display module 160.

In operation 705, according to certain embodiments, the first electronic device 101 may be directed toward the external electronic device 410 to be registered by using the second camera module 282. According to certain embodiments, the first electronic device 101 may recognize the external electronic device 410 pre-registered in the control application, based on the captured picture of the external electronic device 410 stored together with the position of the external electronic device 410. Accordingly, as a guide for the recognized external electronic device 410 is displayed on a display screen, the user may be more accurately directed toward the external electronic device 410.

In operation 706, according to certain embodiments, the first electronic device 101 may calculate the distance and angle between the first electronic device 101 and the second electronic device 430 through communication with the second electronic device 430.

In operation 707, according to certain embodiments, the first electronic device 101 may calculate the distance between the first electronic device 101 and the external electronic device 410, based on the distance and angle between the first electronic device 101, and the second electronic device 430 and the distance from the second electronic device 430 and the rear wall, which was obtained and stored during registration of the external electronic device 410 in the control application. According to certain embodiments of the disclosure, the distance between the first electronic device 101 and the external electronic device 410 may be calculated, as illustrated in FIG. 6.

According to certain embodiments, the distance from the rear wall where the external electronic device 410 is located to the second electronic device 430 may be determined by placing the first electronic device 101 on the rear wall and then calculating the distance between the first electronic device 101 and the second electronic device 430.

According to certain embodiments, the distance from the rear wall where the external electronic device 410 is located to the second electronic device 430 may be obtained using a focal length or a depth sensor of the second camera module 282.

According to certain embodiments, the distance from the rear wall where the external electronic device 410 is located to the second electronic device 430 may be obtained through a user input.

According to certain embodiments, the first electronic device 101 may measure the distance between the rear wall and the first electronic device 101 through a communication connection with another external electronic device which is located on the rear wall and equipped with a communication function enabling measurement of a direction and a distance, and obtain the distance between the rear wall and the second electronic device 430 based on the measured distance.

In operation 708, according to certain embodiments, the first electronic device 101 may calculate the position of the external electronic device 410 based on the distance between the first electronic device 101 and the external electronic device 410. According to certain embodiments, the first electronic device 101 may display a UI on the display module 160, to control the external electronic device in operation 709.

Various methods using a short-range wireless communication scheme such as Bluetooth, Zigbee, Wi-Fi, and/or NFC may be applied to subsequent specific operations in which the electronic device 101 controls the external electronic device 410, and a description of the methods is avoided herein.

Referring to FIG. 7B, operations 711 to 717 are identical to operations 701 to 707 of FIG. 7A, and thus their redundant description will be avoided.

According to certain embodiments, the first electronic device 101 may receive the position of the external electronic device 410, stored in the external server 440 (e.g., the server 108 of FIG. 1) in operation 718, and calculate the position of the external electronic device 410 based on the received position of the external electronic device 410 and the distance between the first electronic device 101 and the external electronic device 410 in operation 719. According to certain embodiments, the first electronic device 101 may display a UI on the display module 160, to facilitate user control of the external electronic device 410 in operation 720.

Various methods using a short-range wireless communication scheme such as Bluetooth, Zigbee, Wi-Fi, and/or NFC may be applied to subsequent specific operations in which the electronic device 101 controls the external electronic device 410, and a description of the methods is avoided herein.

Figure 8A:
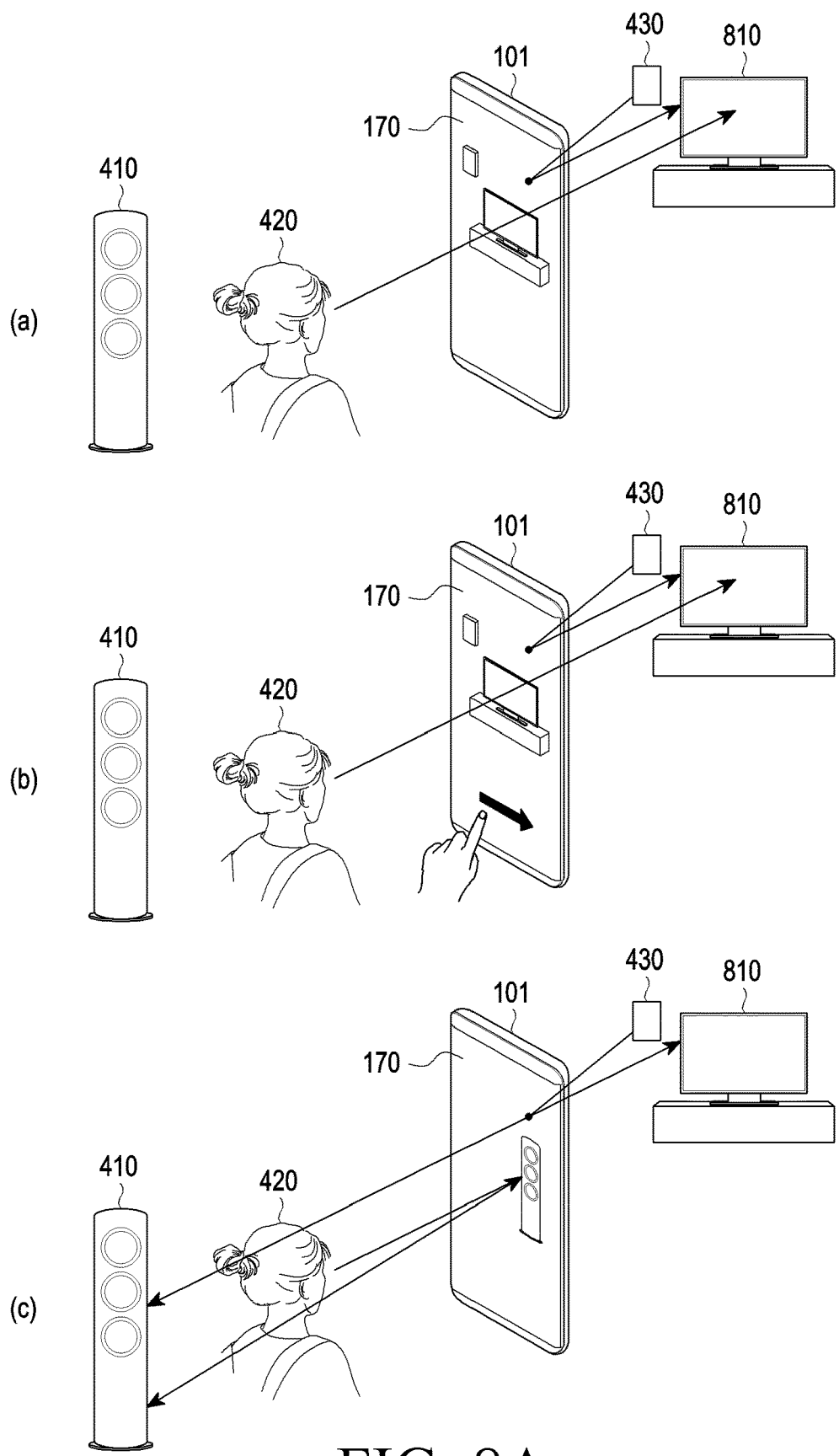
FIGS. 8A and 8B are diagrams illustrating an operation of registering an external electronic device in a control application by positioning the external electronic device by an electronic device according to certain embodiments.
Figure 8B:
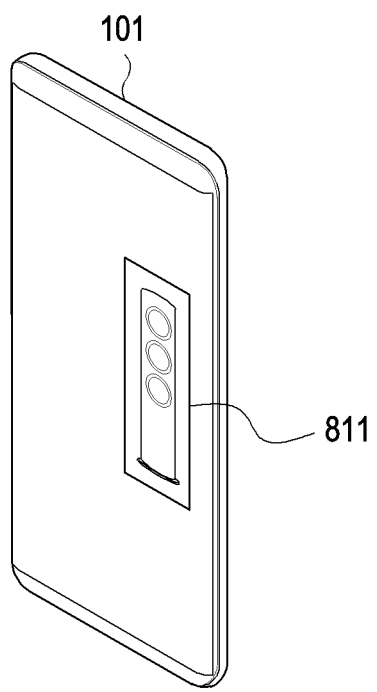

FIGS. 8A and 8B are diagrams illustrating an operation of positioning an external electronic device and registering the external electronic device in a control application by an electronic device according to certain embodiments.

Referring to (a) of FIG. 8A, according to certain embodiments, when the first electronic device 101 executes a control application, according to an input of the user 420, to register the external electronic device 410 (e.g., an air conditioner) in the control application, the rear camera of the first electronic device 101 may operate according to a default setting of the control application, and a scene recognized through the rear camera of the first electronic device 101 may be displayed on a display module 170. In (a) of FIG. 8A, the second electronic device 430 (e.g., UWB device) and a TV 810 located in front of the user 420 may be displayed on the display module 170. Since the air conditioner 410 is located behind the user 420, the air conditioner 410 may not be displayed on the display module 170 while the rear camera of the first electronic device 101 is operating.

According to an embodiment, when the user 420 wants to register the TV 810 in the control application, the user 420 may touch the TV 810 displayed on the display module 170, to request calculation of the position of the TV 810, and registration of the TV 810 in the control application. According to an embodiment, as the TV 810 is located in front of the first electronic device 101, the first electronic device 101 may calculate the distance and angle between the first electronic device 101 and the second electronic device 430 through communication (e.g., UWB communication) between the first electronic device 101 and the second electronic device 430, calculate the position of the TV 810 based on the distance and angle between the first electronic device 101 and the second electronic device 430, and store the position of the TV 810. According to certain embodiments, as the first electronic device 101 stores a picture of the TV 810 together with the position of the TV 810, a guide may be displayed on a display screen in the vicinity of the displayed image of TV 810 to increase the recognition rate of the external electronic device 410, and allow the user to accurately orient the first electronic device 101 towards the TV 810 during control of the TV 810 through the control application, after registration is complete.

Referring to (b) of FIG. 8A, according to certain embodiments, the user 420 may switch a camera mode to register the air conditioner 410 in the control application. In the embodiment of (b) of FIG. 8A, the user 420 may switch the camera mode of the electronic device 101 from a rear camera mode to a front camera mode by touching and swiping the display module 170. According to certain embodiments, when the user 420 touches a separate camera mode switch icon, the first electronic device 101 may switch the camera mode. According to certain embodiments, the first electronic device 101 may switch the camera mode by detecting a voice or a gaze movement of the user 420, using the sensor module (e.g., the sensor module 176 of FIG. 1) of the first electronic device 101.

Referring to (c) of FIG. 8A, according to certain embodiments, when the camera mode is switched, a scene captured through the front camera of the first electronic device 101 may be displayed on the display module 170 (e.g., as per a selfie mode). In (c) of FIG. 8A, the air conditioner 410 located behind the user 420 may be displayed on the display module 170. Since the second electronic device 430 and the TV 810 are located in front of the user 420, they may not be displayed on the display module 170 while the front camera of the first electronic device 101 is activated and the rear camera is deactivated.

According to certain embodiments, the first electronic device 101 may simultaneously drive the front camera and the rear camera, and thus simultaneously display the second electronic device 430 and the TV 810 recognized through the rear camera of the first electronic device 101 and the air conditioner 410 recognized through the front camera on the display module 170.

According to an embodiment, when the user 420 wants to register the air conditioner 410 in the control application, the user 420 may touch the air conditioner 410 displayed on the display module 170 and position the air conditioner 410.

According to certain embodiments, the first electronic device 101 may calculate the distance and angle between the first electronic device 101 and the second electronic device 430 through communication with the second electronic device 430. According to certain embodiments, the first electronic device 101 may calculate the distance between the air conditioner 410 and the first electronic device 101 based on the distance and angle between the first electronic device 101 and the second electronic device 430. According to certain embodiments of the disclosure, the first electronic device 101 may calculate the distance between the first electronic device 101 and the air conditioner 410 based on the distance and angle between the first electronic device 101 and the second electronic device 430, and the distance from the rear wall on which the external electronic device 410 is located to the second electronic device 430.

According to certain embodiments, the distance from the rear wall where the air conditioner 410 is located to the second electronic device 430 may be determined by placing the first electronic device 101 on the rear wall and calculating the distance between the second electronic device 430 and the first electronic device 430.

According to certain embodiments, the distance from the rear wall where the air conditioner 410 is located to the second electronic device 430 may be obtained using a focal length or a depth sensor of the second camera module 282.

According to certain embodiments, the distance from the rear wall where the air conditioner 410 is located to the second electronic device 430 may be obtained through a user input.

According to certain embodiments, the first electronic device 101 may measure the distance from the rear wall to the first electronic device 101 through a communication connection with another external electronic device (not shown) having a communication function enabling measurement of a direction and a distance, and obtain the distance from the rear wall to the second electronic device 430 based on the measured distance.

According to certain embodiments, the first electronic device 101 may calculate the position of the air conditioner 410 based on the distance between the first electronic device 101 and the air conditioner 410. According to certain embodiments, the first electronic device 101 may register the air conditioner 410 in the control application by storing the calculated position of the air conditioner 410 in the memory of the first electronic device 101 (e.g., the memory 130 of FIG. 1) or an external server (e.g., the server 108 of FIG. 1).

According to certain embodiments, as the first electronic device 101 stores a picture of the air conditioner 410 together with the position of the air conditioner 410, a guideline 811 may be displayed in the vicinity of the air conditioner 410 on a display screen to increase the recognition rate of the external electronic device 410 and allow the user to accurately direct the first electronic device 101 toward the air conditioner 410 during control of the air conditioner 410 through the control application after the registration.

Figure 9:
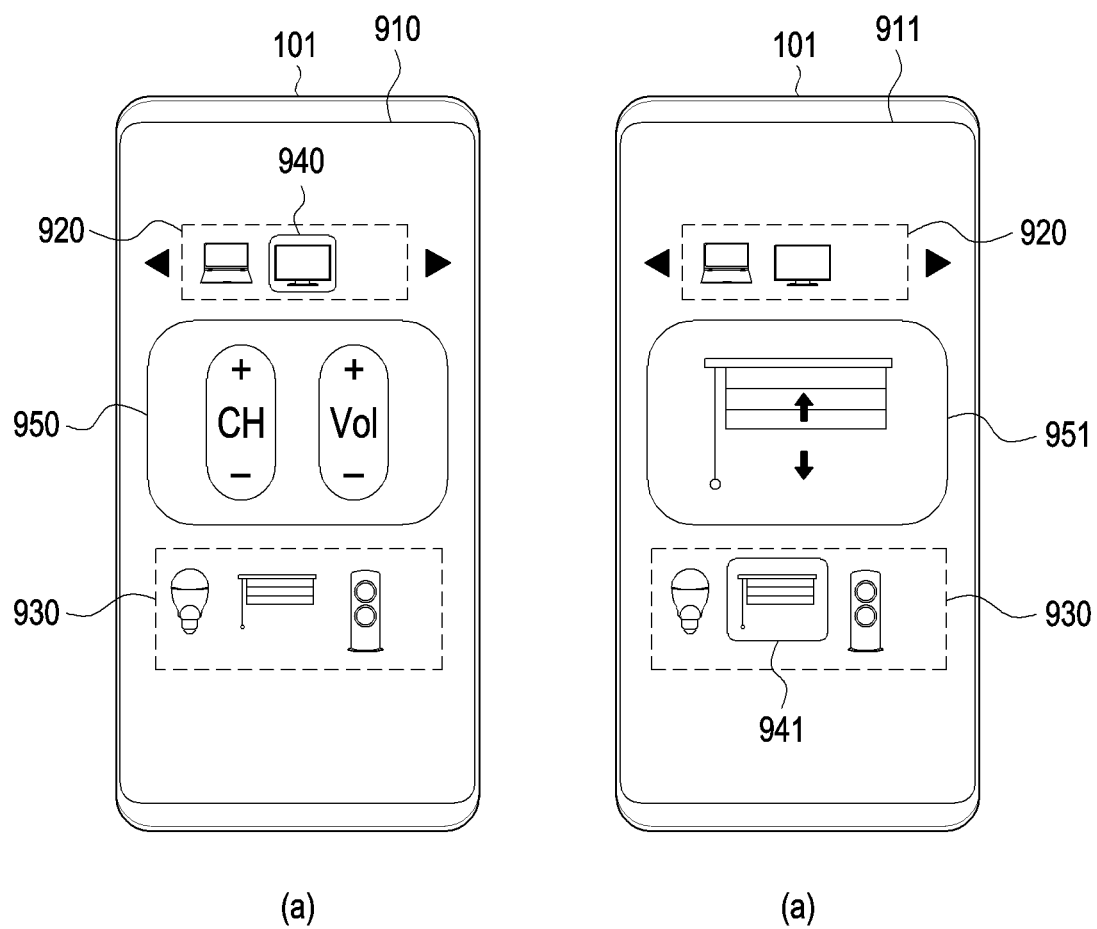
FIG. 9 is a diagram illustrating a user interface (UI) of a control application to control an external electronic device by an electronic device according to certain embodiments.

FIG. 9 is a diagram illustrating a UI of a control application to control an external electronic device by an electronic device according to certain embodiments.

Referring to (a) of FIG. 9A, according to certain embodiments, when the user executes the control application of the electronic device 101, the first electronic device 101 may simultaneously operate the front camera and the rear camera of the first electronic device 101 according to a default setting of the control application, and accordingly, external electronic devices 920 recognized through the rear camera and external electronic devices 930 recognized through the front camera may be displayed on a display screen 910. As illustrated in (a) of FIG. 9, according to certain embodiments, the external electronic devices 920 recognized through the rear camera may be disposed in an upper part of the display screen 910, and the external electronic devices 930 recognized through the front camera may be disposed in a lower part of the display screen 910. According to certain embodiments, the external electronic devices 920 recognized through the rear camera may be located in the lower part of the display screen 910, and the external electronic devices 930 recognized through the front camera may be disposed in the upper part of the display screen 910.

According to an embodiment, when the user selects a first external electronic device 940 (e.g., a TV) from among the external electronic devices 920 located in front of the first electronic device 101, a UI 950 for controlling the selected first external electronic device 940 may be displayed on the display screen 910. In (a) of FIG. 9, the TV is selected, and accordingly, a channel control button and a volume control button may be displayed on the UI 950 to control the TV. According to an embodiment, a guideline for distinguishing the first external electronic device 940 selected by the user may be displayed.

Referring to (b) of FIG. 9, according to certain embodiments, when the user selects a second external electronic device 941 (e.g., an electric blind) from among the external electronic devices 930 located behind the first electronic device 101, a UI 951 for controlling the selected second external electronic device 941 may be displayed on the display screen 910. In (b) of FIG. 9, the electric blind is selected, and accordingly, a vertical control button for controlling the electric blind may be displayed on the UI 951. According to an embodiment, a guideline for distinguishing the second external electronic device 942 selected by the user may be displayed.

Those skilled in the art will understand that certain embodiments described herein may be organically applied to each other within an applicable range. For example, those skilled in the art will understand that at least some operations of an embodiment described herein may be skipped, and that at least some operations of an embodiment and at least some operations of another embodiment may be applied in a close relationship.

According to certain embodiments, an electronic device (e.g., the electronic device 101 of FIGS. 1 and 2) may include a communication module (e.g., the communication module 190 of FIGS. 1 and 2); a first camera (e.g., the camera module 180 of FIGS. 1 and 2) disposed on a first surface of a housing; a second camera (e.g., the camera module 180 of FIGS. 1 and 2) (e.g., the first camera module 281 of FIG. 2) disposed on a second surface of the housing opposite to the first surface; and at least one processor (e.g., the processor 120 of FIGS. 1 and 2) electrically coupled to the communication module, the first camera, and the second camera. The at least one processor may be configured to execute an application for registering and controlling at least one first external electronic device (e.g., the external electronic device 410 of FIG. 4), based on a user input, establish a communication connection with a second external electronic device, (e.g., the second electronic device 430 of FIG. 4) using the communication module, obtain at least one of an angle or a distance between the second external electronic device and the electronic device, obtain a distance between the electronic device and the at least one first external electronic device, based on the at least one of the angle or the distance between the second external electronic device and the electronic device, and obtain a position of the at least one first external electronic device, based on the distance between the electronic device and the at least one first external electronic device.

According to certain embodiments, the at least one processor may be configured, when a menu for registering the at least one first external electronic device in the application is selected by the user input, to recognize the at least one first external electronic device by driving the first camera, obtain a distance between the electronic device and the at least one external electronic device based on the at least one of the angle or the distance between the second external electronic device and the electronic device and a distance between the electronic device and a rear wall on which the at least one first external electronic device is located and located in a direction in which the first camera faces, and obtain the position of the at least one first external electronic device based on the distance between the electronic device and the at least one first external electronic device, and store the obtained position of the at least one first external electronic device.

According to certain embodiments, the at least one processor may be configured to calculate the distance between the electronic device and the rear wall, based on a distance between the electronic device located on the rear wall and the second external electronic device.

According to certain embodiments, the at least one processor may be configured to establish a communication connection with a third external electronic device located on the rear wall and communicable using the communication module, obtain a distance between the third external electronic device and the electronic device, and calculate the distance between the electronic device and the rear wall on which the at least one external electronic device is located, based on the distance between the electronic device and the second external electronic device and the distance between the third external electronic device and the electronic device.

According to certain embodiments, the at least one processor may be configured to calculate the distance between the electronic device and the rear wall, based on a focal length or a depth sensor of the first camera.

According to certain embodiments, the at least one processor may be configured to obtain the distance between the electronic device and the rear wall, based on a user input.

According to certain embodiments, the at least one processor may be configured, when a menu for controlling the at least one first external electronic device in the application is selected by the user input, to obtain a position of the at least one first external electronic device, based on the position of the at least one first external electronic device and the distance between the electronic device and the at least one first external electronic device and display a user interface for controlling the at least one first external electronic device on a display of the electronic device.

According to certain embodiments, the at least one processor may be configured to discontinue driving of the second camera and drive the first camera based on the user input received during the driving of the second camera, or simultaneously drive the second camera and the first camera based on the user input received during the driving of the second camera.

According to certain embodiments, the at least one processor may be configured to store the position of the at least one first external electronic device in a memory of the electronic device or an external server.

According to certain embodiments, the communication module may support a UWB scheme.

According to certain embodiments, a method of operating an electronic device (e.g., the electronic device 101 of FIGS. 1 and 2) may include executing an application for registering and controlling at least one first external electronic device (e.g., the external electronic device 410 of FIG. 4), based on a user input, establishing a communication connection with a second external electronic device (e.g., the second electronic device 430 of FIG. 4) communicable with the electronic device, using a communication module (e.g., the communication module 190 of FIGS. 1 and 2) of the electronic device, obtaining at least one of an angle or a distance between the second external electronic device and the electronic device, recognizing the at least one first external electronic device located in a direction allowing capturing by a first camera (e.g., the camera module 180 of FIGS. 1 and 2) (e.g., the second camera module 282 of FIG. 2) disposed on a first surface of a housing of the electronic device by driving the first camera, obtaining a distance between the electronic device and the at least one first external electronic device, based on the at least one of the angle or the distance between the second external electronic device and the electronic device, and obtaining a position of the at least one first external electronic device, based on the distance between the electronic device and the at least one first external electronic device.

According to certain embodiments, the method may further include, when a menu for registering the at least one first external electronic device in the application is selected by the user input, obtaining the distance between the electronic device and the at least one external electronic device based on the at least one of the angle or the distance between the second external electronic device and the electronic device, and obtaining a distance between the electronic device and a rear wall on which the at least one first external electronic device is located and located in a direction in which the first camera faces, and the position of the at least one first external electronic device based on the distance between the electronic device and the at least one first external electronic device, and storing the obtained distance.

According to certain embodiments, obtaining the distance between the electronic device and the at least one external electronic device may include calculating the distance between the electronic device and the rear wall, based on a distance between the electronic device located on the rear wall and the second external electronic device.

According to certain embodiments, the method may further include establishing a communication connection with a third external electronic device located on the rear wall and communicable using the communication module, obtaining a distance between the third external electronic device and the electronic device, and calculating the distance between the electronic device and the rear wall on which the at least one external electronic device is located, based on the distance between the electronic device and the second external electronic device and the distance between the third external electronic device and the electronic device.

According to certain embodiments, obtaining the distance between the electronic device and the at least one external electronic device may include calculating the distance between the electronic device and the rear wall, based on a focal length or a depth sensor of the first camera.

According to certain embodiments, obtaining the distance between the electronic device and the at least one external electronic device may include obtaining the distance between the electronic device and the rear wall based on a user input.

According to certain embodiments, the method may further include, when a menu for controlling the at least one first external electronic device in the application is selected by the user input, obtaining a position of the at least one first external electronic device, based on the position of the at least one first external electronic device and the distance between the electronic device and the at least one first external electronic device, and displaying a user interface for controlling the at least one first external electronic device on a display of the electronic device.

According to certain embodiments, the method may further include discontinuing driving of the second camera and driving the first camera based on the user input received during the driving of the second camera, or simultaneously driving the second camera and the first camera based on the user input received during the driving of the second camera.

According to certain embodiments, the method may further include storing the position of the at least one first external electronic device in a memory of the electronic device or an external server.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   memory storing instructions;
   a communication module;
   a first camera disposed on a first surface of a housing; and
   at least one processor electrically coupled to the communication module, the first camera,
   wherein instructions that, when executed by the at least one processor individually and/or collectively, cause the electronic device to:

execute an application for registering and controlling at least one first external electronic device, based on a user input, establish a communication connection with a second external electronic device different from the at least one first external electronic device, using the communication module, obtain an angle and a distance between the second external electronic device and the electronic device, visually detect, via the first camera, the at least one first external electronic device located in a field-of-view of the first camera;

calculate an angle and a distance between the electronic device and the at least one first external electronic device, based on the obtained angle and the obtained distance between the second external electronic device and the electronic device and a distance from the electronic device to a wall on which the at least one first external electronic device is located, and determine a position of the at least one first external electronic device, based on the calculated angle and the calculated distance between the electronic device and the at least one first external electronic device.

2. The electronic device of claim 1, wherein the visual detection of the at least one first external electronic device is based on detecting a selection of a menu for registering the at least one first external electronic device in the application, and wherein the distance between the electronic device and the at least one first external electronic device is calculated further based on a distance between the electronic device and the wall on which the at least one first external electronic device is located, and wherein instructions that, when executed by the at least one processor individually and/or collectively, cause the electronic device to store calculated distance between the electronic device and the wall.

3. The electronic device of claim 2, wherein the distance between the electronic device and the wall is calculated based on the distance between the electronic device located on the wall and the second external electronic device.

4. The electronic device of claim 2, wherein instructions that, when executed by the at least one processor individually and/or collectively, cause the electronic device to:

calculate a distance between the electronic device and a third external electronic device located on the wall through a communication connection established between the electronic device and the third external electronic device, and calculate the distance between the electronic device and the wall on which the at least one first external electronic device is located, based on the distance between the electronic device and the second external electronic device, and the distance between the third external electronic device and the electronic device.

5. The electronic device of claim 2, wherein instructions that, when executed by the at least one processor individually and/or collectively, cause the electronic device to:

calculate the distance between the electronic device and the wall, based on a focal length of the first camera, or using a depth sensor of the first camera.

6. The electronic device of claim 2, wherein instructions that, when executed by the at least one processor individually and/or collectively, cause the electronic device to:

obtain the distance between the electronic device and the wall, based on the user input.

7. The electronic device of claim 2, further comprising a display, wherein the position of the at least one first external electronic device is calculated based on detecting a selection of a menu for controlling the at least one first external electronic device in the application, and wherein instructions that, when executed by the at least one processor individually and/or collectively, cause the electronic device to:

in response to the selection of the menu, control the display to display a user interface for controlling the at least one first external electronic device.

8. The electronic device of claim 1, further comprising a second camera disposed on a second surface of the housing opposite to the first surface, wherein instructions that, when executed by the at least one processor individually and/or collectively, cause the electronic device to:

when the user input is received while the second camera is activated, execute one of:

terminating activation of the second camera and activating the first camera, or activating the first camera while maintaining activation of the second camera, so that both the first and second cameras are simultaneously activated.

9. The electronic device of claim 2, wherein instructions that, when executed by the at least one processor individually and/or collectively, cause the electronic device to:

store the position of the at least one first external electronic device in a memory of the electronic device, or on an external server.

10. The electronic device of claim 1, wherein the communication module supports ultra-wideband (UWB) communication.

11. A method of operating an electronic device, the method comprising:

executing, via at least one processor, an application for registering and controlling at least one first external electronic device, based on a user input, establishing a communication connection with a second external electronic device different from the at least one first external electronic device, via a communication module, obtaining an angle and a distance between the second external electronic device and the electronic device, visually detecting, via a first camera, the at least one first external electronic device located in a field-of-view of the first camera, and calculate an angle and a distance between the electronic device and the at least one first external electronic device, based on the obtained angle and the obtained distance between the second external electronic device and the electronic device and a distance from the electronic device to a wall on which the at least one first external electronic device is located, and determine a position of the at least one first external electronic device, based on the calculated angle and the calculated distance between the electronic device and the at least one first external electronic device.

12. The method of claim 11, wherein calculating a distance between the electronic device and the wall on which the at least one first external electronic device is located is based on detecting a selection of a menu for registering the at least one first external electronic device in the application, and the method further comprising:

storing the calculated distance between the electronic device and the wall.

13. The method of claim 12, wherein the distance between the electronic device and the wall is calculated based on the distance between the electronic device located on the wall and the second external electronic device.

14. The method of claim 12, further comprising:
calculate a distance between the electronic device and a third external electronic device located on the wall through a communication connection established between the electronic device and the third external electronic device, and
calculating the distance between the electronic device and the wall on which the at least one first external electronic device is located, based on the distance between the electronic device and the second external electronic device, and the distance between the third external electronic device and the electronic device.

15. The method of claim 12, wherein the distance between the electronic device and the wall is calculated based on a focal length of the first camera, or using a depth sensor of the first camera.

16. The method of claim 12, wherein the distance between the electronic device and the wall is obtained based on the user input.

17. The method of claim 12, wherein the position of the at least one first external electronic device is calculated when a selection is received for a menu for controlling the at least one first external electronic device in the application, and
wherein the method further comprises:
in response to the selection of the menu, displaying, via a display, a user interface for controlling the at least one first external electronic device.

18. The method of claim 11, wherein the first camera is disposed on a first surface of a housing, the method further comprising:
when the user input is received while a second camera disposed on a second surface of the housing opposite to the first surface is activated, executing one of:
terminating activation of the second camera and activating the first camera, or
activating the first camera while maintaining activation of the second camera, so that both the first and second cameras are simultaneously activated.

19. The method of claim 12, further comprising:
storing the position of the at least one first external electronic device in a memory of the electronic device, or on an external server.

20. The method of claim 11, wherein the communication module supports ultra-wideband (UWB) communication.

* * * * *